July 3, 1962  P. H. McMURRAY ETAL  3,042,000
FARROWING EQUIPMENT
Filed June 2, 1958  4 Sheets-Sheet 1

INVENTORS
P. H. McMURRAY
and
BY J. M. HAGGARD
Robb & Robb
attorneys

July 3, 1962 P. H. McMURRAY ETAL 3,042,000
FARROWING EQUIPMENT
Filed June 2, 1958 4 Sheets-Sheet 2

INVENTORS
P.H. McMURRAY
and
BY J. M HAGGARD
Robb & Robb
attorneys

INVENTORS
P. H. McMURRAY
and
BY J. M. HAGGARD

Robb & Robb
Attorneys

July 3, 1962
P. H. McMURRAY ETAL
3,042,000
FARROWING EQUIPMENT
Filed June 2, 1958
4 Sheets-Sheet 4
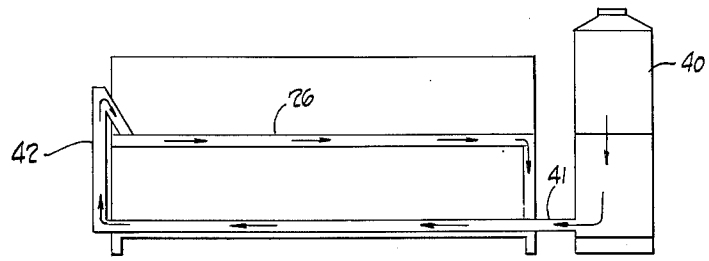
FIG_5
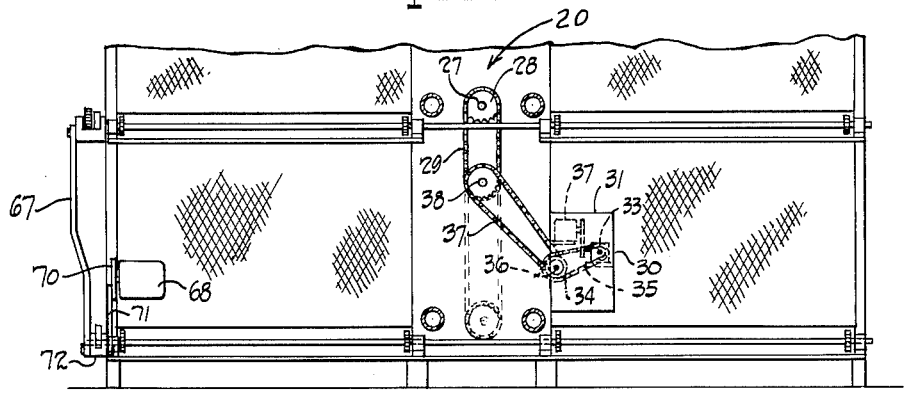
FIG_6
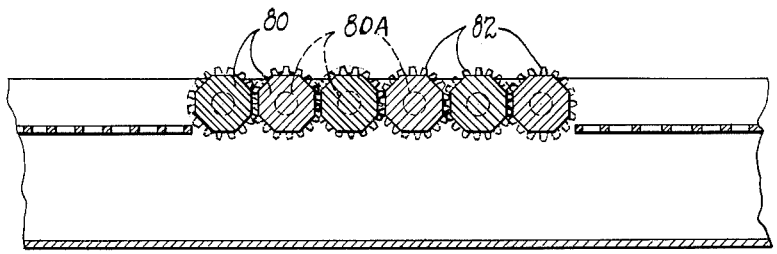
FIG_7
INVENTORS
P. H. McMURRAY
and
BY J. M. HAGGARD
Robb & Robb
attorneys United States Patent Office — 3,042,000, Patented July 3, 1962

3,042,000
FARROWING EQUIPMENT
Paul H. McMurray and John M. Haggard, Delphi, Ind., assignors, by mesne assignments, to A. O. Smith Harvestore Products, Inc., Kankakee, Ill., a corporation of Delaware
Filed June 2, 1958, Ser. No. 739,365
5 Claims. (Cl. 119—20)

This invention relates to farrowing units, and more particularly to the novel concept of providing safe, sanitary, and comfortable facilities for the farrowing process while at the same time largely providing automatic operation thereof.

Heretofore in the art of raising sows, and the sows in turn of raising their offspring, it has been customary to merely provide certain farrowing pens which were of necessity unsanitary and more often than not resulted in disease and injury to the small animals or offspring during the initial stages of their lives.

The primary difficulty heretofore has arisen from the fact that the problem of removal of waste, being a natural difficulty, has always relied upon the farmer or his help to constantly attend to this phase of the operation as well as being required to provide adequate feed and water to the sow and her offspring during the early stages of their lives, the sow obviously requiring substantial quantities of feed and water to provide necessary nourishment for the offspring.

Another problem involved in the farrowing process, is that usually a substantial amount of space is required for the various animals and while they are largely confined, often times they are permitted to roam free very shortly after farrowing takes place. This of course is a dangerous difficulty since it often results in injury to the small pigs by the sow in lying down and movement prior to or after the nursing of the offspring has taken place or at other times as movement is required or the sow feels necessity for the same.

A yet further problem is that involved in the fact that whereas the sows of necessity must be let out of pens in order to clean the same, and thus roam on the ground, ground carried diseases are likewise much more prevalent among sows which farrow under these conditions and raise their offspring likewise.

It is therefore a principal object of this invention to provide a novel farrowing unit in which each sow is provided with an individual pen so to speak, in which the farrowing may take place and in which subsequently the offspring are raised, through the first three or four weeks of their lives, such arrangement being sanitary and safe for the small animals.

Yet another object of this invention is to provide a series of pens which will thus in turn provide for the confinement of a sow in each and likewise subsequently the offspring after they are born, the pens being so constructed that all waste matter passes therefrom without requiring attention by anyone and the waste matter is removed as it accumulates, preventing any disease from being carried thereby from one animal to another or from the offspring of one animal to the offspring of another as the case may be.

Yet another object of this invention is to provide a series of pens so arranged that a minimum of floor space is required and likewise enables the supplying of feed in a constant manner whereby feed and water likewise constantly supplied are continuously available to the animal confined within the pen.

A still further object of the invention is to so arrange the farrowing unit as to its individual pen portions that all of the various operations required in raising animals such as the feeding, supplying with a feed supply, water supply, removal of waste and providing for a supply of conditioned air, are all automatic in operation and require only a minimum amount of attention by the farmer or his help as necessary.

Yet another object of the invention is to provide a somewhat peculiar floor formation for each of the pens whereby the sow is supported on a raised portion in a central area, the floor thereof being formed so as to prevent injury to the sow when nursing the offspring as to her udders and teats as the case may be and the sow likewise being unable to move into the adjacent areas in which the offspring are able to have a confined area to themselves and yet such offspring are easily able to obtain access to the sow for nursing purposes, the floor of each area and all of the areas being arranged to facilitate the passage of waste matter therethrough whereby the same may be subsequently removed as it accumulates.

Other and further objects of this invention will be understood from a consideration of the specification appended hereto and disclosed in the drawings wherein:

FIGURE 5 is a diagrammatic view illustrating the movement of feed and feed supply for the pens in the unit.

FIGURE 6 is an end view, fragmentary in nature illustrating certain of the operating elements hereof.

FIGURE 7 is an end view, fragmentary in nature, and corresponding somewhat to FIGURE 4 showing a different form of floor as to certain elements therein.

Figure 1:
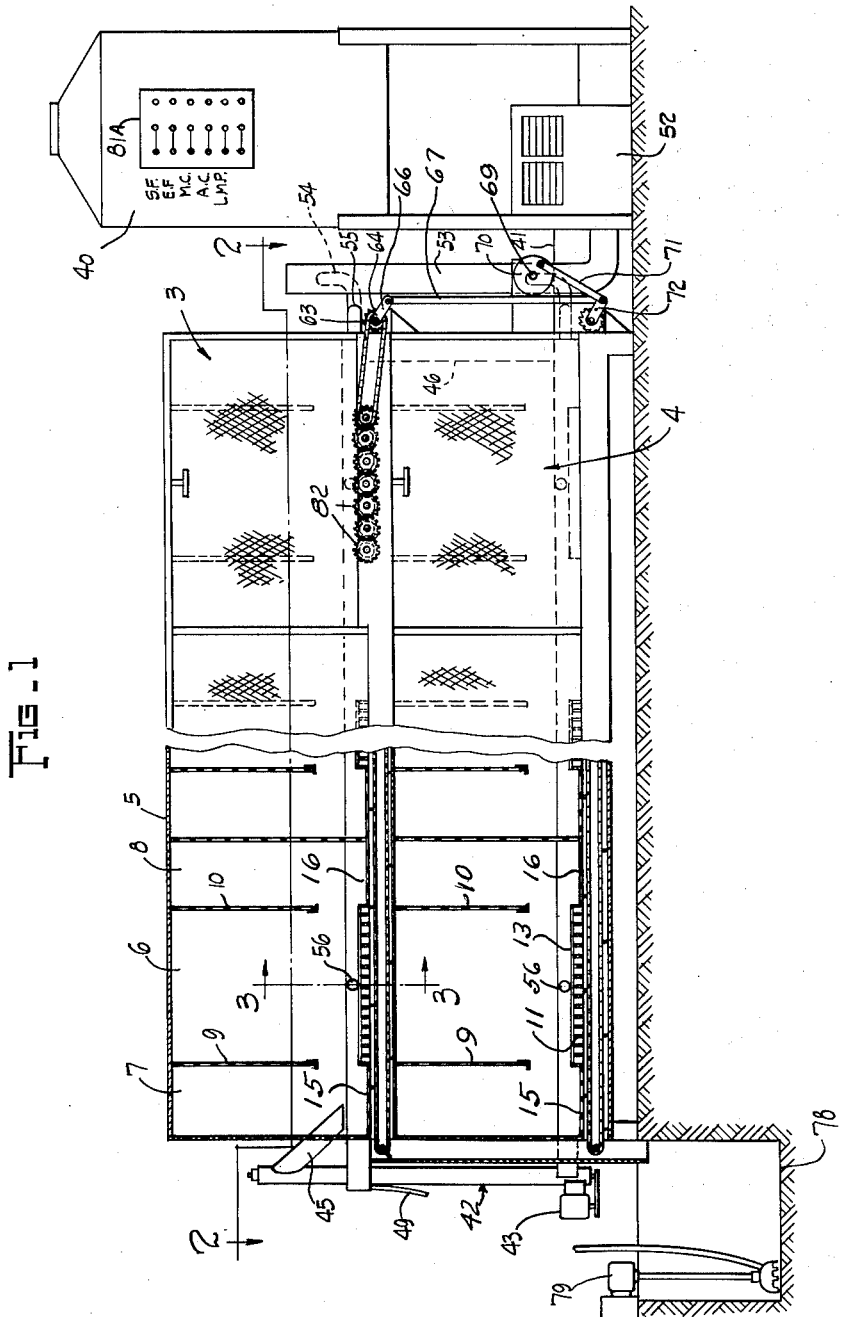
FIGURE 1 is a side elevation, partly in section and somewhat fragmentary, illustrating the general arrangement of the unit of this invention and particularly disclosing certain pens provided therein and the arrangement thereof.
Figure 2:
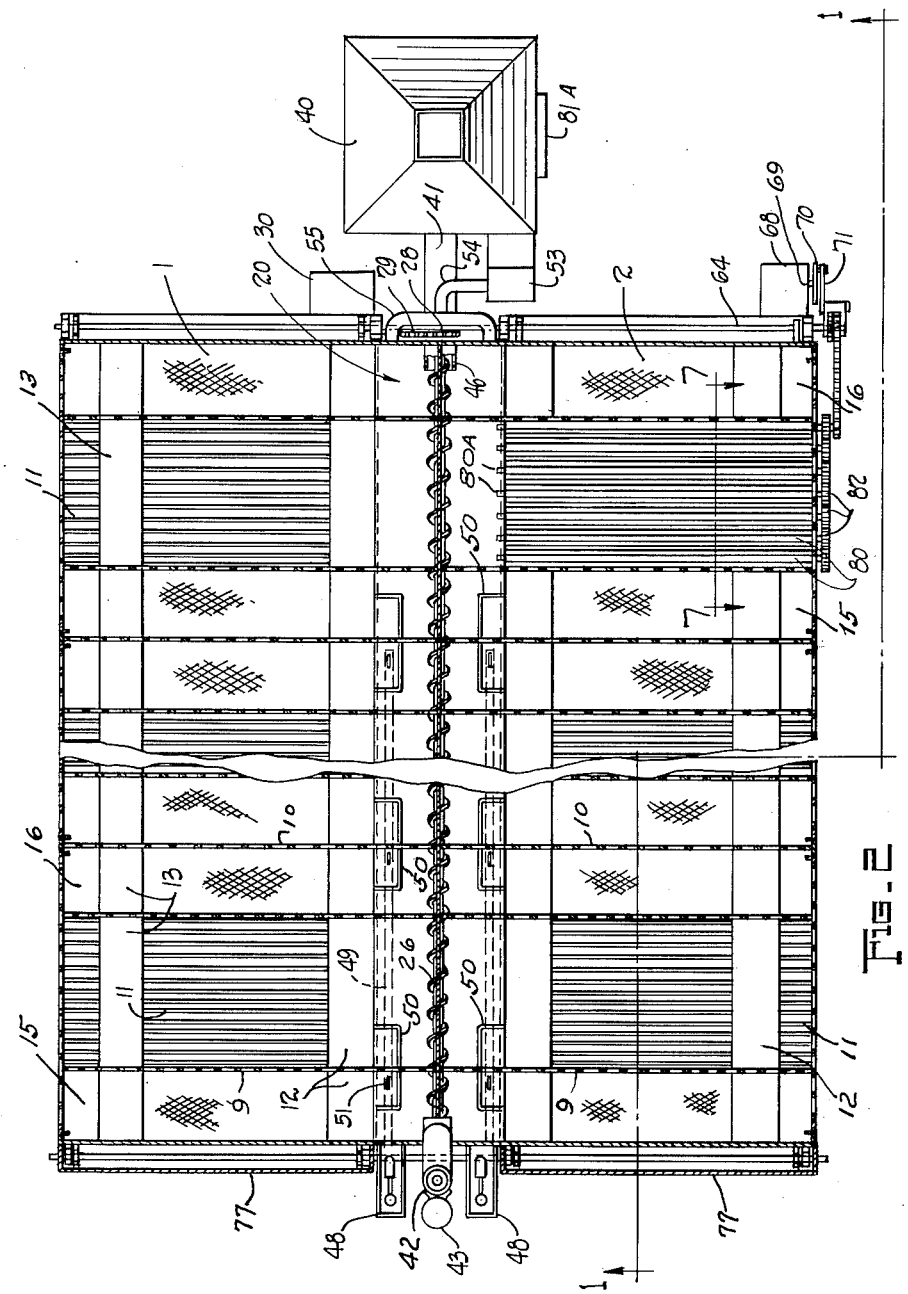
FIGURE 2 is a sectional view taken about on the line 2—2 of FIGURE 1 looking in the direction of the arrows, to more particularly disclose the arrangement of the pens and central supply area or unit provided therefor.

Referring initially to FIGURES 1 and 2, the farrowing unit of this invention is disclosed as comprising a pair of spaced pen sections denoted in FIGURE 2 generally at 1 and 2, said pen sections in each case being double decked so as to provide an upper deck 3 and a lower deck 4 generally speaking.

Each deck includes a series of pens therein in this case there being shown three pens for the upper deck 3 and three pens for each lower deck 4, each pen comprising substantially the same elements and in this case the pen in the upper left hand portion of FIGURE 1 in the upper deck 3 thereof will be described and is denoted at 5 as comprising a central area 6 of such a size to confine a sow therein. At each side of the central area is provided a secondary area the one at the left being denoted 7 and the one at the right being denoted 8 in the pen 5 being here described, these secondary areas 7 and 8 being intended to receive the offspring after they are born so that they will have free space to move about in and the sow cannot lie down upon them or otherwise injure them. This provision is made possible by the walls such as 9 and 10 which extend downwardly from the top of each pen to within a short distance of the floor thereof, the distance being calculated so as to permit the small pigs to pass under the lower edges of the walls 9 and 10 and thus have access to the sow for nursing purposes or so as to roam and yet prevent the sow from moving out of the central area 6 into either of the secondary areas 7 or 8.

Figure 4:
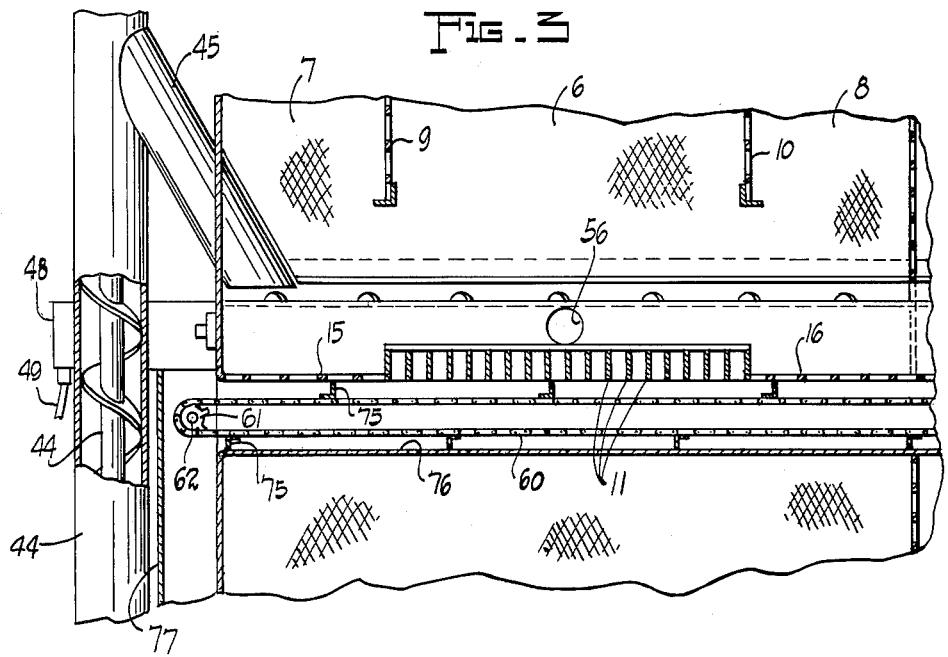
FIGURE 4 is a somewhat enlarged fragmentary view taken about on the line 4—4 of FIGURE 3 looking in the direction of the arrows and further illustrating certain of the elements hereof.

Referring now more particularly to FIGURES 2 and 4, the floor construction of the individual pens will now be described. As has been pointed out, the central area 6 is substantially larger in extent so as to make possible the confining of the sow therein, and the floor of this area is constructed of a series of strips 11, extending from front to rear of the pen or area and of such spacing and weight as to support the sow but at the same time provide ample area for the waste matter to pass downwardly through the said strips or series of strips as the case may be. Thus there is formed a sort of grille upon which the sow may readily stand or lie down as the case may be with these strips and the floor construction is of course likewise calculated so as to prevent any injury to the sow as to her udders or teats which might be caught in the other type of foraminated or perforated floor. It is of course understood that this particular grille work or grille-like floor has been found to be satisfactory but there are obviously variations hereof which could be adapted for the purposes and are clearly understood as being suggested hereby.

Provided at the inner portion of the pen central area is a transverse flat strip 12 which provides a sort of platform upon which the sow's forefeet may be positioned so as to positively insure that no damage will occur to her hooves and there is likewise provided at the other portion of the pen at 13 a similar strip upon which the sow's rear feet may be supported in normal standing position. Of course the sow may stand up or lie down within the central area and as will be noted from a consideration of FIGURE 4 the grille provided by the strips 11 further provides a surface which is considerably raised from the adjacent floors 15 and 16 of the areas 7 and 8 respectively. These floors 15 and 16 may be of any suitable foraminated material which have openings of such a size as to facilitate the passage of waste matter therethrough but at the same time prevent the hooves of the small pigs from being caught or passing downwardly therein.

An important feature of this floor construction is the fact that the sow is located on a raised floor as contrasted with the floors 15 and 16 whereby when the sow is lying down so as to facilitate the nursing by the small pigs, her udders are easily accessible to such small pigs and are not placed in such a position as would be difficult of access. They are of course likewise positioned so as to prevent any injury thereto and the small pigs stand on such a lower level relatively speaking as makes the nursing process much more uniform as respects the entire group of offspring.

Figure 3:
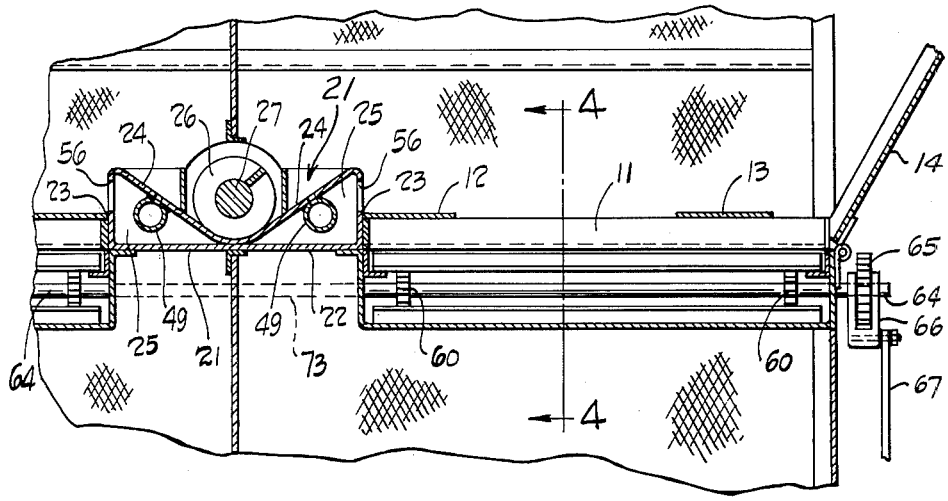
FIGURE 3 is an enlarged somewhat fragmentary view taken about on the line 3—3 of FIGURE 1 looking in the direction of the arrows, to more particularly disclose formation of certain of the elements hereof.

Turning now to a consideration of the central area which in this case is denoted a central supply area and indicated by the numeral 20, it will be seen that this area is duplicated at both levels, or that is facilities provided therein are furnished for both decks of the unit, in this case the upper deck being shown in detail as illustrated by FIGURE 2 and FIGURE 3, said supply area including a longitudinally located trough-like structure generally denoted 21 which is comprised of a bottom member 22 spanning the space between the sections 1 and 2, and having the upright members 23 therefor, the upright members in turn engaging at their upper ends with downwardly converging parts 24 which parts 24 meet at the central portion and form air passage ways 25.

The unit now being discussed and particularly the trough portion formed by the members 24 is in turn provided at its central portion with a screw unit generally denoted 26, as mounted and driven by a shaft 27, said screw 26 being driven from one end as illustrated at FIGURE 2 by a suitable sprocket 28 in turn connected to a chain 29 and the chain 29 being driven by a drive unit generally denoted 30 more particularly shown in FIGURE 6 as to the details thereof, including a housing 31 within which is mounted a drive motor 32, the drive motor 32 being connected to a reducing gear unit 33 and the reducing gear unit 33 in turn connected to a sprocket 34 by a chain 35. The sprocket 34 being mounted on a shaft 36 drives a further sprocket and chain 37 connected thereto, the chain 37 being desirably connected to a sprocket mounted on a shaft 38, the shaft 38 supporting a further sprocket to drive the chain 29 and the sprocket 28 connected thereto, whereby the screw 26 is revolved by the shaft 27.

In order to supply the feed to the screw 26, the lower deck supply is connected thereto, the lower deck being supplied directly from a storage bin 40, which delivers the feed at the lower end thereof to a screw in a conduit 41, the conduit 41 leading to the central area and a screw within the lower trough like member of the lower deck 4, the screw carrying the feed to the left hand end as illustrated in FIGURE 1 where the same is picked up by an elevating screw located in an elevating unit generally denoted 42.

The elevating unit 42 includes a drive motor 43 driveably connected to a screw mounted within the member and indicated at 44 in FIGURE 4, whereby the feed is carried upwardly as delivered by the lower screw within the conduit in the feed section of the lower deck, upwardly and delivered by a delivery pipe such as 45 shown in FIGURES 1 and 4, whereby the feed is dropped onto the end of the screw 26 whereby the same may be thus moved from left to right as viewed in FIGURE 1 or FIGURE 2. Thus there is supplied at all of the pens a constant supply of feed as required by the sows or as the small pigs themselves learn to eat, the feed moving toward the right hand end as viewed in FIGURE 2 and dropping downwardly in a chute such as 46 wherein it reaches the right hand end of the screw in the lower deck and thus is mingled if there is any feed supplied thereby with the feed supplied from the storage bin 40. It will of course be apparent that the storage bin 40 is provided with suitable drive means which are not illustrated but which can be readily supplied by those skilled in the art as to the screw section thereof for the purpose of this disclosure.

The diagrammatic disclosure in FIGURE 5 illustrates the manner in which the feed passes from the feed bin or storage bin 40 through the conduit 41 into the lower screw section, then to the elevating screw unit 42 and to the upper screw generally indicated in FIGURE 5 and at 26 representative of the 26 disclosure in FIGURE 3.

The supply of water to each of the pen areas is next described, including as it does float chambers such as illustrated in FIGURE 2 at 48, these chambers being connected by the pipes such as 49 referring to FIGURES 1 and 4 whereby water is supplied and common types of float units are provided to maintain a constant water level in the chambers 48. These chambers 48 are in turn connected by longitudinally extending pipes 49, the upper deck supply being described at this point, which pipes 49 extend within the conduits 25 previously described and lead to trough elements provided by the part 50 for each pen, the water supply entering through an opening such as 51 in the bottom of each trough element 50. There is thus provided for each pen adequate water supply for both the sow and the small pigs as the case may be, such water supply being maintained at a constant level desirably. It should also be noted that the location of the supply pipes 49 within the conduit 25 provides a further beneficial location as will be now explained in reference to the provision of an air supply which is at all times conditioned and directed to each of the pens.

This air supply just mentioned, is directed from a central air conditioning unit at 52 denoted in FIGURE 1, to a main manifold 53 which extends upwardly and as for example is illustrated in FIGURE 2, in turn connected by a suitable pipe 54 to a further manifold 55 which manifold 55 is connected to the conduits 25 at the ends as will be clearly understood. Thus the air delivered through the manifold 53 is directed to the conduits 25. The conduits 25 are provided at the central portion of each pen and in the center of each pen at the feed trough area thereof with an opening such as illustrated in FIGURE 4 at 56 whereby the air is delivered adjacent the sow's mouth so that comfortable temperature is provided at all times in as much as the sow largely is cooled or heated by oral supply.

As has been suggested heretofore, the arrangement of the conduits 25 and the openings 56 therein is such as to supply air constantly and the same may of course be cooled or heated as outside temperature conditions demand. This air supply of course in turn is available to the small pigs and if necessary obviously openings may be provided in the secondary areas 7 and 8 at the feed trough area thereof for their use.

The fact that the conduits 25 furnish air constantly under controlled conditions, and the further fact that the pipes 49 extend therewithin, will likewise make apparent that the water within the pipes 49 will likewise be conditioned so as to be warmed or cooled by the air from the conduits 25.

Turning now to a discussion of the means for removing waste matter, it will be understood that this is one of the most important phases of this particular unit, and is provided for by conveyor units which extend beneath each of the rows of pens on each deck, and more particularly illustrated as to certain of its aspects in FIGURES 3, 4, and 6, wherein the conveyor moves longitudinally beneath the floors provided by the floors 15 and 16 and the grille formed of the members 11, the conveyor being in the form of an endless chain such as 60 mounted at one end for example on the sprocket 61 and shaft 62 therefor, there being one chain at each side of the conveyor as suggested by FIGURE 3 and of course a sprocket at each end for each chain.

At the right hand end of the unit as viewed from FIGURE 1, there is provided a further sprocket for each chain such as indicated at 63, this sprocket 63 being mounted on a shaft 64. The shaft such as 64 referring now to FIGURE 3 extends outwardly beyond the unit and has mounted thereon a ratchet gear 65 around which is a yoke 66, the yoke 66 in turn carrying a ratchet member thereon which ratchet member is intended to move the member 65 and the shaft 64 connected thereto. The yoke 66 is in turn directed by a downwardly extending link 67 to a corresponding unit for the lower deck which unit is driven by a drive unit 68 having extending therefrom a shaft 69 driving an eccentric member 70. The member 70 is connected to a further link 71 which is likewise connected to the lower yoke 72 and thus in turn to the link 67 which drives the upper yoke 66.

The conveyor units for each of the sections 1 and 2 are substantially identical as to their construction in both the upper and lower decks and the units are desirably connected by the shaft portions such as 73 connecting the shaft 64 with its opposite shaft 64 for the other section.

The chains 60 are provided with transversely extending angle scraper members such as 75 which members 75 move along over the solid bottom 76 of the waste conveyor area and in this instance move at the lower flight of the chain toward the left as viewed in FIGURE 4 so as to carry the waste matter over the bottom and to the left hand extremity of the unit. There are provided at the left hand ends of the sections chutes such as 77 which extend downwardly and are directed to a pit indicated at 78 whereby the waste matter is collected therein so that it may subsequently be pumped out as desired by the pump generally denoted at 79 being thus in the form of liquid manure.

It will be understood that by the operation of the eccentric drive unit 68, the waste conveyor chains are moved step by step, or of course they may be moved continuously if desired by other means so as to constantly move any waste matter accumulated as it drops downwardly through the floors 15 and 16 and the grille formed by the parts 11 whereby the same is accumulated and moved to the left hand end of the unit and dropped downwardly into a collecting pit.

It might be explained that each of the pens is provided with a door such as indicated as 14 in FIGURE 3 whereby the animals may be moved into the respective pens or of course removed therefrom.

Suitable controls for all of the apparatus herein mentioned are provided and these in turn regulated from a control panel 81A mounted for convenience on the storage bin 40 a suitable control providing for the conveyor from the feed bin 40 through the conduit 41, for the elevating conveyor 42 and for the waste conveyors in each of the decks. Likewise an air conditioning control for the member 52 is furnished and for the liquid manure pump 79 likewise.

It will of course be understood that suitable timing of the operation of the various devices may be effected by appropriate control means, such means forming no part of this invention, but being provided by those skilled in the art.

It might be pointed out that the feed storage bin 40 is of such a size as will furnish feed to the conveyors for a substantial period of time and any mixture of feed may be placed in the storage bin and directed to the conveyors and in turn to the animals supplied thereby.

Referring to FIGURE 7 there is shown a somewhat different form of floor involving elements which are operable by the animal itself so as to constantly maintain the floor in clean and sanitary condition.

In place of the bars or strips 11 previously described in reference to FIGURE 4 for example, suitable hexagonal shaped members such as 80 may be provided, these being in the form of relatively large cross sectional members extending from end to end of the pen and providing the sow with a surface upon which to stand. It will of course be understood that the portions 12 and 13 are eliminated under these circumstances and the hexagonal bars or rods 80 are mounted pivotally at each end so as to be freely rotatable. Thus during movement of the sow over the floor, the bars 80 will be rotated and cause waste matter to drop down or be forced down between the said bars onto the surface 76 whereby the same may be carried subsequently to one end of the mechanism.

It is of course understood that a different form of rod, in cross section, may be provided if found desirable which will be actuated by the sow in movement over the floor so as to carry out the purpose herein just before described.

It is also of course within the contemplation of this arrangement that by reason of the last described floor construction, it is possible that the floor may be periodically actuated by any convenient mechanism so that the bars or rods such as 80 will be rotated upon the ends 80A thereof these being at both ends as mentioned before. Of course this will require some gearing but that is supplied by providing a gear at one end of each of the rods 80 which gears may intermesh and may be in turn actuated by any suitable mechanism whereby the floor is constantly maintained in cleaned waste-free condition. Gears such as shown in FIGURE 7 at 82 may be arranged to intermesh and thus cause a simultaneous movement of all of the rods 80 for example upon actuation by any suitable source of power.

It is within the further purview of this invention that the air conditioning portion hereof, which is the unit 52 may be arranged so as to supply a suitable treatment to the animals in the various pens, as for example some kind of a medication in the form of a volatile material which is readily carried by the current or air and delivered to each pen. Thus treatment of the animals may be effected if for some reason they are diseased or it is necessary to otherwise treat them. As a matter of fact of course under these conditions a suitable tranquilizing medium may be resorted to, and even further if found desirable carbon dioxide in sufficient concentration may be supplied so as to stupefy the sows if necessary to remove the same from the pen.

The foregoing of course suggests many other variations in the form of treatment materials and these are all within the contemplation of this invention.

By reason of the construction of the water supply means and the supply of water to each pen in a series of individual means from a common source, it is likewise contemplated that if necessary treatment of the animals for various types of diseases may be effected by means of treating the water supply. At the same time it is also contemplated that in lieu of solid feeding by means of the screw conveyors provided on the various levels, liquid feed may be supplied through the water system as is here shown. It is of course further contemplated that any means of controlling or supplying the water to the various trough elements 15 is intended to be availed of if necessary so that feeding of liquid of various consistencies may be resorted to. Of course under these circumstances the screw conveyors would only be a supplemental arrangement to provide the feeding of different types of food under various conditions not ordinarily encountered.

We claim:

1. A farrowing apparatus comprising, an animal enclosure adapted to accommodate a sow and her offspring, the enclosure being provided with a plurality of connecting walls which act to provide a complete animal enclosure, a foraminated floor disposed adjacent the connecting walls and having a fixed raised portion adapted to support a sow thereupon, waste removal means co-operatively associated with the foraminated floor, confining walls spaced above the raised floor portion and disposed to cooperate with the connecting walls of the enclosure to restrict the movement of a sow supported on the raised floor portion to the raised floor portion whereby the offspring of a sow may thrive in the comparative safety of the area of the enclosure adjacent the raised portion into which the sow is unable to gain access and nourishment of the offspring of the sow is facilitated by making the udders of the sow readily accessible.

2. A farrowing apparatus comprising, a plurality of animal confining enclosures disposed in side-by-side relation with each enclosure being separated from adjacent enclosures by sidewalls and having end walls connecting the sidewalls, each enclosure being provided with a foraminous floor, each floor having a fixed raised portion adapted to support a sow, confining walls spaced above the raised portion of the floor and co-operating with the walls of the enclosure to restrict the movement of a sow to the raised portion of the floor whereby the offspring of a sow may thrive in the comparative safety of the area of the enclosure adjacent the raised portion into which the sow is unable to gain access and nourishment of the offspring of the sow is facilitated by making the udders of the sow readily accessible.

3. A farrowing apparatus comprising, a series of animal confining enclosures arranged in fixed side-by-side relation, waste removal means co-operatively associated with the series of animal enclosures, means disposed co-extensively with the series of enclosures to supply feed to the enclosures, means disposed in communication with each enclosure to provide the animal confined therein with conditioned air; each enclosure being separated from adjacent enclosures by sidewalls, end walls connecting the sidewalls, a floor disposed beneath each enclosure and having a foraminated portion adapted to support the offspring of a sow, the floor being provided with a sow supporting raised portion formed of strips of material spaced apart whereby a sow may comfortably stand or lie upon the strips without injury and waste material may gravitate therefrom onto the waste removal means, and sow confining means disposed within each enclosure and spaced above the raised portion of the floor whereby the activity of a sow is restricted to the raised portion of the enclosure and injury of both the sow and her off-spring may be averted.

4. A farrowing unit comprising, a plurality of animal confining pens arranged in fixed side-by-side alignment and separated by sidewalls, each pen being adapted to accommodate a single sow and her off-spring, each pen being provided with end walls, each pen being provided with a floor having a fixed raised portion adapted to support a sow thereupon and a confining wall spaced above the raised portion of the floor and adapted to co-operate with the end walls to confine a sow to the riased floor portion, the area of each enclosure provided between a side-wall and the raised floor portion being adapted to accommodate offspring of the sow whereby the offspring may avail themselves of nourishment from the sow without danger of being crushed by the sow and without the danger of injuring the udders of the sow.

5. The method of farrowing which comprises confining a sow in an area at the end of her gestation period, positioning the sow within the area of her confinement in fixed elevated relationship, permitting the sow to farrow while so confined, mechanically removing waste matter from the area of sow confinement without removing the sow, providing the sow with a constant feed supply adjacent the area of her confinement, providing the sow with a constant supply of conditioned air, and providing the offspring of the sow with an area of confinement adjacent the elevated position of the sow and in communication therewith whereby the offspring may freely take nourishment from the sow and due to the elevated position of the sow will avoid injuring the udders of the sow.

References Cited in the file of this patent

UNITED STATES PATENTS

| | | |
|---|---|---|
| 436,902 | Osborn | Sept. 23, 1890 |
| 2,257,734 | Cornell | Oct. 7, 1941 |
| 2,311,640 | Cornell | Feb. 23, 1943 |
| 2,314,344 | Cornell | Mar. 23, 1943 |
| 2,602,419 | Johnson | July 8, 1952 |
| 2,847,993 | Woodruff | Aug. 19, 1958 |